(12) United States Patent
Maddrell (10) Patent No.: US 12,498,633 B2
(45) Date of Patent: Dec. 16, 2025

(54) PROJECTOR WITH AUDIO AND ANIMATION

(71) Applicant: COTTAGE DOOR PRESS, LLC, Rolling Meadows, IL (US)

(72) Inventor: Richard G. Maddrell, Barrington, IL (US)

(73) Assignee: COTTAGE DOOR PRESS, LLC, Rolling Meadows, IL (US)

( * ) Notice: Subject to any disclaimer, the term of this patent is extended or adjusted under 35 U.S.C. 154(b) by 0 days.

(21) Appl. No.: 18/669,054

(22) Filed: May 20, 2024

(65) Prior Publication Data

US 2025/0355336 A1    Nov. 20, 2025

(51) Int. Cl.
　　G03B 31/00　　(2021.01)
　　G03B 21/14　　(2006.01)
　　H04R 1/02　　(2006.01)

(52) U.S. Cl.
　　CPC .......... *G03B 31/00* (2013.01); *G03B 21/145* (2013.01); *H04R 1/028* (2013.01); *G03B 2206/002* (2013.01)

(58) Field of Classification Search
　　CPC ... G03B 31/00; G03B 2206/002; G03B 21/14
　　See application file for complete search history.

(56) References Cited

U.S. PATENT DOCUMENTS

| | | | | |
|---|---|---|---|---|
| 2009/0213332 | A1* | 8/2009 | Fujinawa | G03B 31/00 353/15 |
| 2013/0297987 | A1* | 11/2013 | Gupta | G06F 11/1064 714/E11.054 |
| 2015/0147932 | A1 | 5/2015 | Vizcarra | |

OTHER PUBLICATIONS

"ZZZMOON," Screenshot photo image and enlargement of storybook projector (taken Mar. 29, 2024), Top Bright Animation Group, Wenzhou, China (1 page). (The year of publication is sufficiently earlier than the effective U.S. Filing date, so that the particular month of publication is not in issue).
"Story Dream Machine," Screenshot photo enlargement image of storybook projector, 2023, August, Little Tikes / MGA Entertainment, Hudson, OH (1 page).
"Dream Switch," Picture book projector, Mar. 2021, Sega Toys Co., Ltd., Kowloon, Japan (1 page). (https://www.amazon.com/Disney-Pixar-Characters-Dream-Switch/dp/B075XNDQP8).
ISA/US, English language verison of the International Search Report, Form PCT/ISA/220, for International Application PCT/US2025/020943, Apr. 23, 2025 (3 pages).
ISA/US, Form PCT/ISA/237, Written Opinion of the International Searching Authority, for International Application PCT/US2025/020943, Apr. 23, 2025 (4 pages).

* cited by examiner

*Primary Examiner* — Ryan D Howard
(74) *Attorney, Agent, or Firm* — Pauley Erickson & Swanson (57) ABSTRACT

A projector, such as a toy projector, in which stored content or information is delivered both as digital images and digital audio content from an interchangeable character which is interchangeably attached to the projector. The stored content or information can be specific to the content and/or theme being displayed and is delivered through an electrical connection to the projector.

20 Claims, 9 Drawing Sheets

PROJECTOR WITH AUDIO AND ANIMATION

BACKGROUND OF THE INVENTION

Field of the Invention

This invention relates to an audio and animation device, such as a projector, having interchangeable character bodies that can be interchangeably replaced with each other, particularly to form different interchangeable story themes containing different content generated from a different processor and/or a different memory device within and/or corresponding to each of the different interchangeable character bodies.

Discussion of Related Art

Some known or conventional toy projectors have a lamp that shines a picture image through a lens and onto a wall so that the user can see the image on the wall. Some known toy projectors also use an electric motor and gear mechanism that allows the displayed image to be read along with a story about the displayed image.

For example, the marketplace currently has a known toy projector identified as Little Tikes Story Dream which is produced by Little Tikes, a U.S. toy company. This conventional toy projector projects the pages of a book while the toy projector unit has a speaker that reads the story aloud. The corresponding audio and imagery are stored within a removable cartridge, and there is one cartridge for each single book. The known audio is digital and the image is produced by shining a light through a piece of Ekta chrome film. With the limited removable cartridge capabilities, the Little Tikes Story Dream holds or contains a total of only about one storybook.

Some known or conventional toy projectors have improvements related to producing digital audio signals and digital images, and also use light sources to display the digital images.

For example, the marketplace currently has a toy projector made by ZZZ Moon, a German company, that created and produces a toy projector that uses the same technology as the Little Tikes toy projector but also delivers the digital image in a different manner, compared to the Little Tikes toy projector. Rather than the one cartridge that contains both the audio and the images in the Little Tikes toy projector, the ZZZ Moon toy projector has a single cartridge that delivers the digital audio for about 8 different books and also delivers the images for the 8 books through 8 different image cartridges. The ZZZ Moon image cartridges use a similar light shining through Ekta chrome film, similar to the Little Tikes toy projector.

Some other known or conventional toy projectors have further improvements related to storing information in a Mini SD card, so that the known toy projector can hold more story content, both audio and visual.

For example, the marketplace currently has a known toy projector made by Sega, a Japanese toy company. Sega has a conventional product called the Dream Switch which uses digital images rather than light directed through Ekta chrome films of the units, as mentioned above. Sega delivers both digital image and digital audio content by way of a Micro SD card which is housed in a protected slot which is a part of the toy projector unit itself.

There is an apparent need for a toy projector that can deliver both audio and video content and signals through a readable memory device, for example, in a way that allows significantly more stored information and also that allows the stored information to be changed by changing different characters and/or different story themes of a removable character body.

SUMMARY OF THE INVENTION

According to some embodiments of this invention, stored information is delivered both as digital images and digital audio content from an interchangeable character which is interchangeably attached to a projector, such as a toy projector. In some embodiments of this invention, the stored information is specific to the content and/or theme being displayed and is delivered, for example, through an electrical connection, such as an 8-pin connector which is located in the body of the interchangeable character. In other embodiments of this invention, there are a multiplicity of different characters that can each and/or all deliver different content or stored information. In some embodiments of this invention, the storage and delivery of the stored information, content and/or media will be different as compared to the known Sega toy projector.

According to some embodiments of this invention, the toy projector of this invention is different from the Little Tikes toy projector and the ZZZ Moon toy projector because this invention delivers digital images as compared to images delivered through film. According to some embodiments of this invention, digital imagery is not as clear as projector film imagery but such embodiments of this invention allow to deliver substantially more content and incorporate movement in the image. In some embodiments of this invention, digital image technology is used but also according to this invention, the use of different characters to deliver different stored information and/or media, particularly through an electrical connection, such as an 8-pin connector, is different from Sega's Micro SD card.

According to some embodiments of this invention, an audio and animation device, such as a projector and/or a toy projector, includes a housing with or having a panel and an interchangeable character body replaceably mounted directly to and/or with respect to the panel. In some embodiments of this invention, the interchangeable character body has a readable memory device and/or a processor mounted within a body of the interchangeable character body. According to some embodiments of this invention, the interchangeable character body has an electrical connection to the panel.

In some embodiments of this invention, a projector lens module is mounted with respect to the housing and/or an audio output device is mounted with respect to the housing. According to some embodiments of this invention, the processor and/or the readable memory device operates the projector lens module to display an image related to the interchangeable character body. In some embodiments of this invention, the processor and/or the readable memory device operates the audio output device to produce a sound related to the interchangeable character body.

According to some embodiments of this invention, a plurality of the interchangeable character bodies are interchangeable and/or replaceable with each other and each of the interchangeable character bodies replaceably fits within the electrical connection, such as any suitable 8-pin connector.

In some embodiments of this invention, a method for operating a projector includes forming an electrical connection on a panel of a housing and/or interchangeably mounting a character body to the panel. According to some embodiments of this invention, the method also includes mounting a readable memory device and/or a processor within the character body. In some embodiments of this invention, a projector lens module is operably mounted with respect to the housing and/or an audio output device is operably mounted with respect to the housing.

According to some embodiments of this invention, a readable memory device stores content of audio and/or video outputs and/or the processor operates the projector lens module to display an image related to the character body and/or the processor operates the audio output device to produce a sound related to the character body. In some embodiments of this invention, a plurality of the character bodies are interchangeably and/or replaceably mounted and each character body has different information stored on a readable memory device communicating with the processor of this invention.

BRIEF DESCRIPTION OF THE DRAWINGS

This invention is explained in greater detail below in view of exemplary embodiments shown in the drawings, wherein.

DETAILED DESCRIPTION OF THE INVENTION

FIGS. 1-17 show different embodiments according to this invention, comprising projector 20 that can be any suitable toy projector, any suitable conventional projector and/or any other audio and animation device and/or mechanism that produces a corresponding image and/or a corresponding sound. In some embodiments of this invention, projector 20 of this invention can be a modified and/or retrofitted conventional or known projector, such as a conventional or known toy projector.

Figure 1:
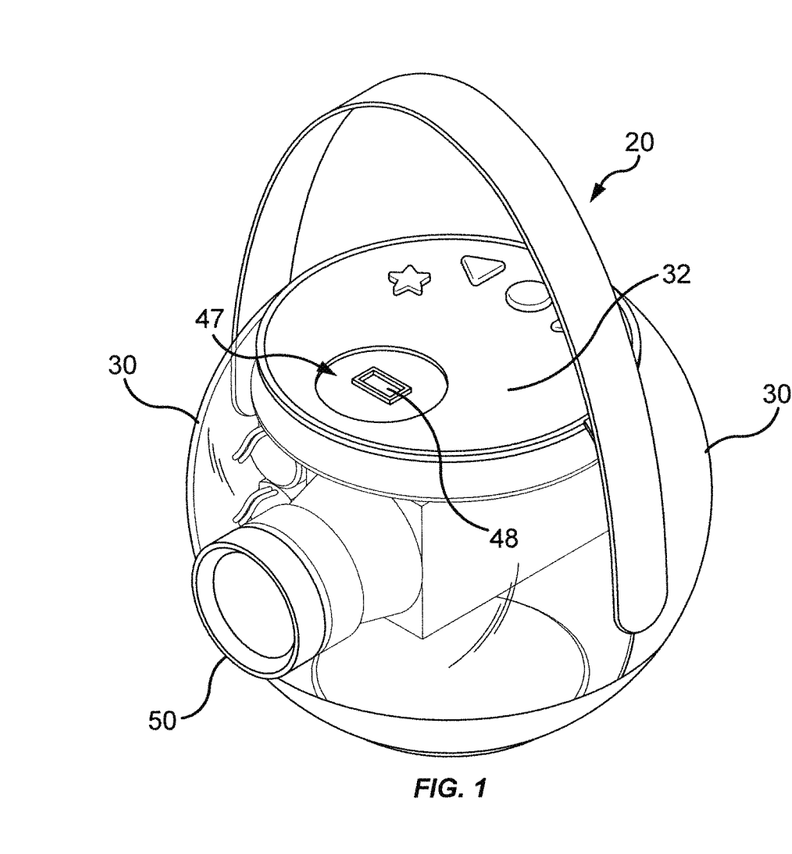
FIG. 1 is a perspective view of a projector, according to one embodiment of this invention.
Figure 2:
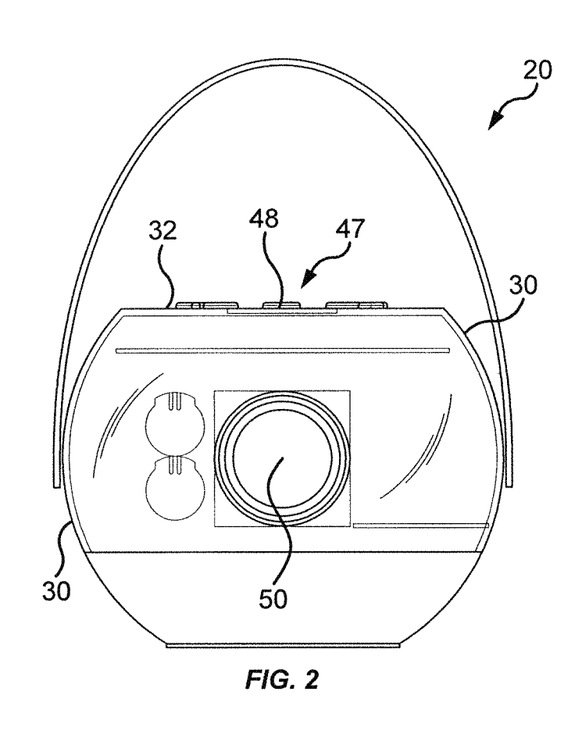
FIG. 2 is a front view of the projector, as shown in FIG. 1.
Figure 3:
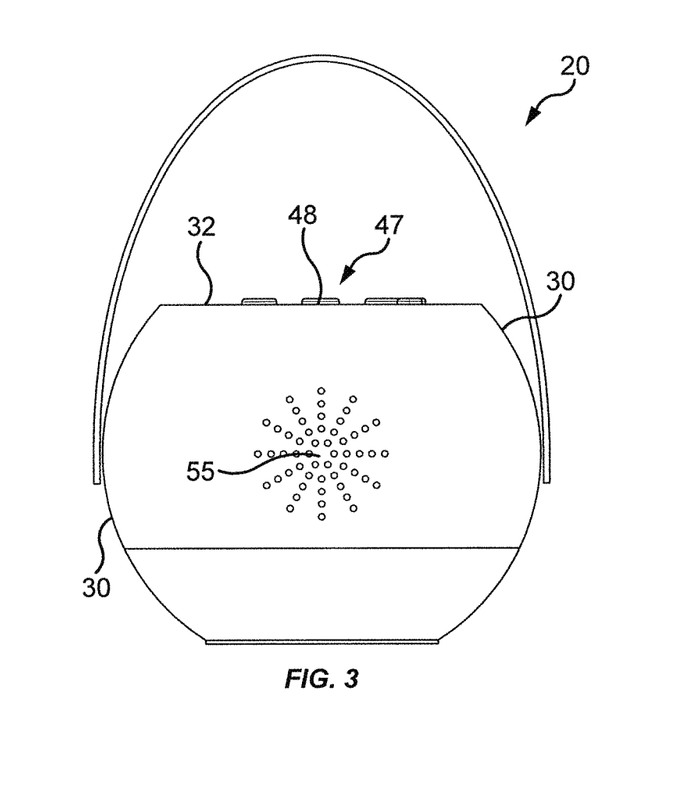
FIG. 3 is a rear view of the projector, as shown in FIG. 1.
Figure 4:
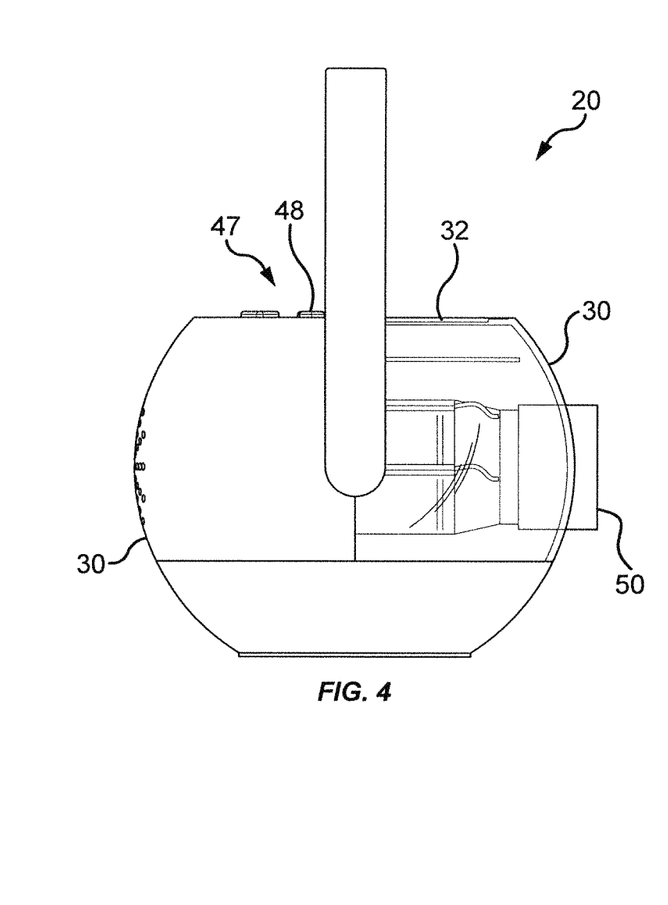
FIG. 4 is a side view of the projector, as shown in FIG. 1.
Figure 5:
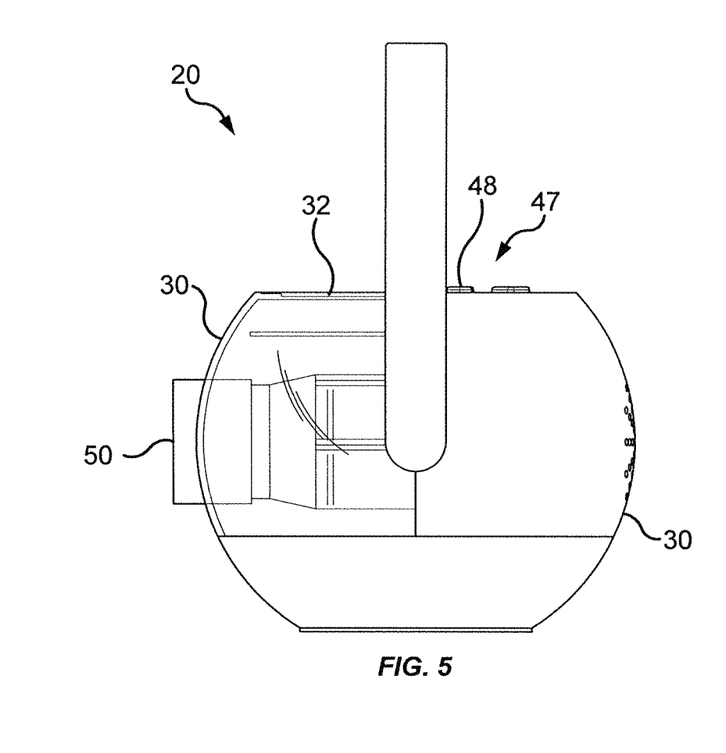
FIG. 5 is a side view, opposite the side view shown in FIG. 4, of the projector, as shown in FIG. 1.
Figure 6:
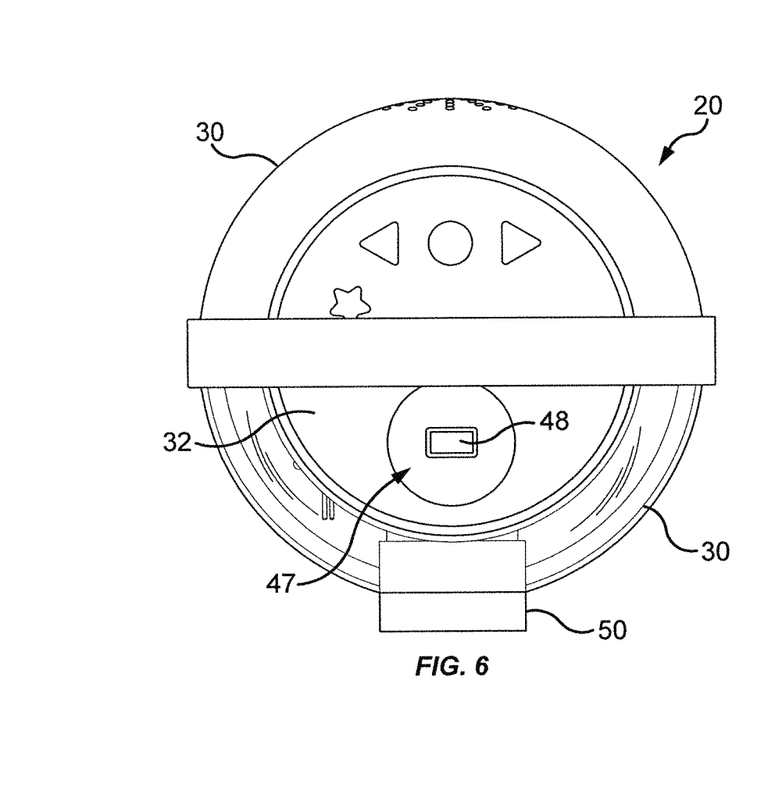
FIG. 6 is a top view of the projector, as shown in FIG. 1.
Figure 7:
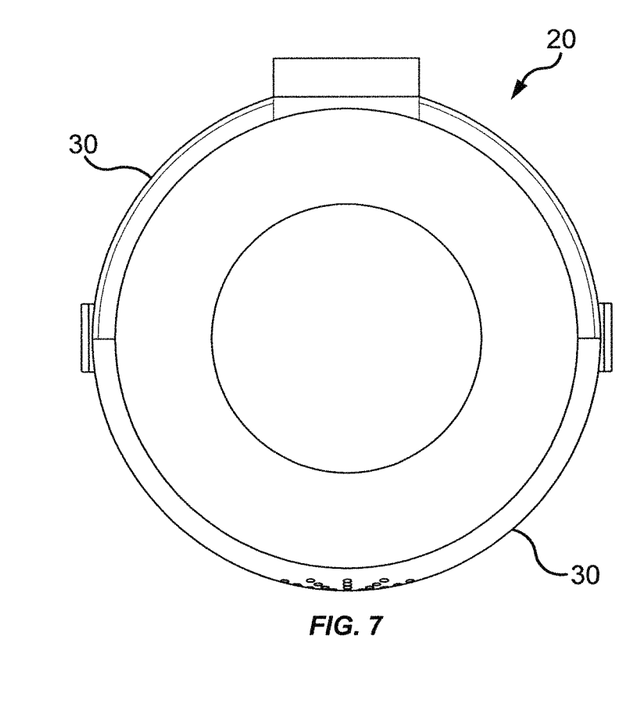
FIG. 7 is a bottom view of the projector, as shown in FIG. 1.
Figure 8:
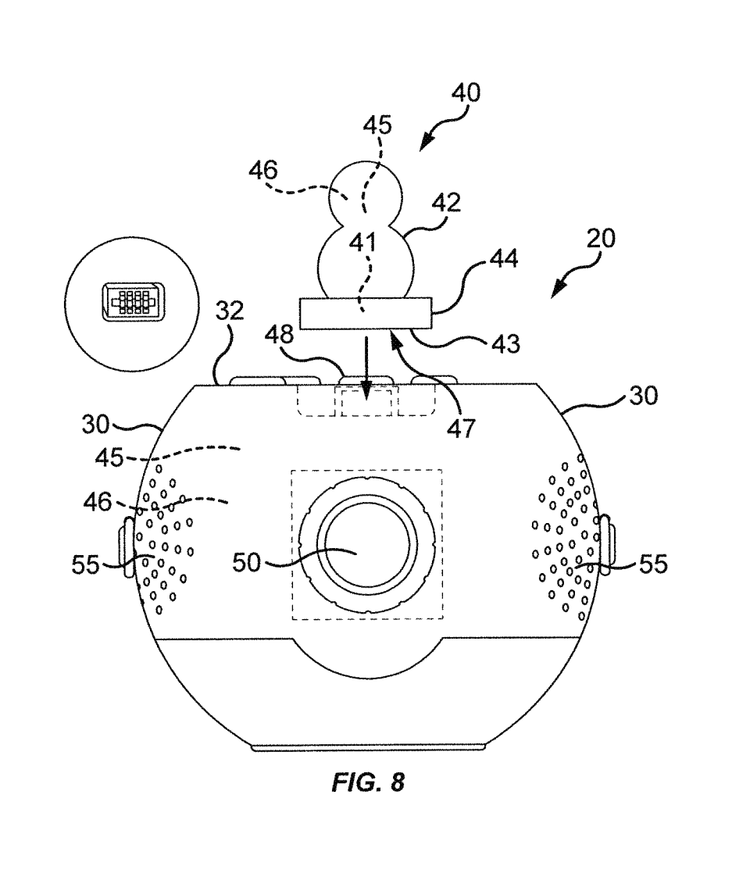
FIG. 8 is a front view of a projector having a replaceable character body not attached to the projector, according to one embodiment of this invention.
Figure 9:
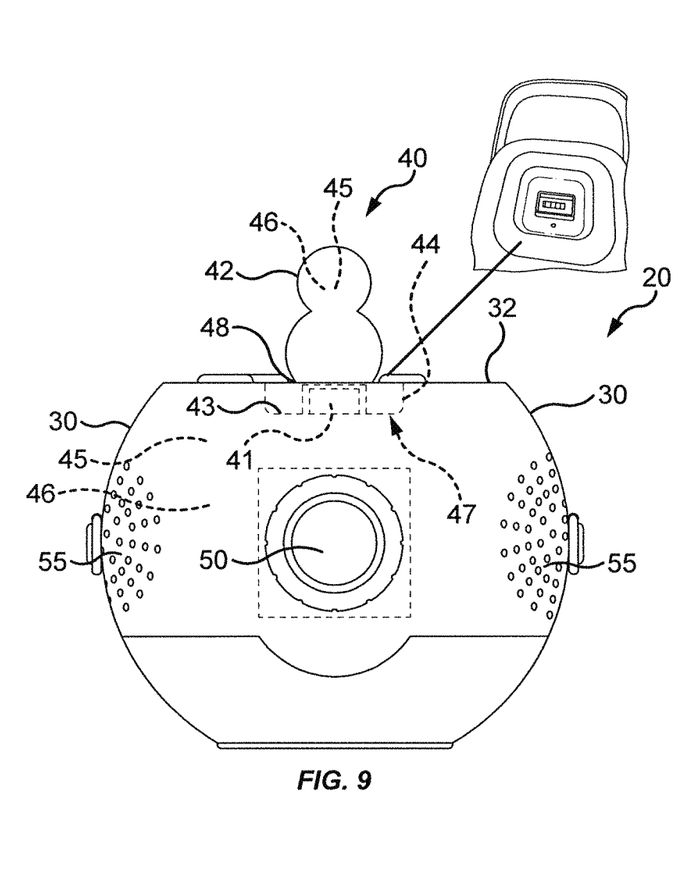
FIG. 9 is a front view of a projector, as shown in FIG. 8, but showing the replaceable character body attached to the projector.

In some embodiments of this invention, projector 20 comprises interchangeable character body 40, as shown in FIGS. 8 and 9, that is replaceably mounted with respect to projector 20. In other embodiments of this invention, projector 20 can be a modified and/or retrofitted conventional or known projector, such as a conventional or known toy projector.

According to some embodiments of this invention, housing 30 comprises panel 32, which can be of any suitable known material and/or can have any suitable size and/or shape that accommodates interchangeable character body 40. In some embodiments of this invention, panel 32 can form any suitable surface on housing 30, particularly that connects, attaches and/or otherwise attaches or accommodates interchangeable character body 40. In some embodiments of this invention, interchangeable character body 40 is connected to, attached to and/or otherwise positioned directly to and/or with respect to panel 32 of this invention. In other embodiments of this invention, interchangeable character body 40 can be connected to, attached to and/or otherwise positioned with respect to a modified and/or retrofitted conventional or known projector, such as a conventional or known toy projector.

In some embodiments of this invention, such as shown in FIGS. 8 and 9, interchangeable character body 40 has readable memory device 46 and/or processor 45 mounted within and/or otherwise positioned in body 42 of interchangeable character body 40. In some embodiments of this invention, also such as shown in FIGS. 8 and 9, housing 30 of projector 20 has readable memory device 46 and/or processor 45 mounted within and/or otherwise positioned in housing 30 of projector 20. According to some embodiments of this invention, processor 45 communicates with readable memory device 46 and/or any other suitable digital memory device, such as any suitable 16-bit chip, 64-bit chip, 128-bit chip, 256-bit chip, 512-bit chip and/or any other suitable size chip and/or chips that can hold memory, such as digital memory and/or computer memory. In some embodiments of this invention, processor 45 comprises any suitable central processing unit (CPU) and/or micro controller unit (MCU) device and/or other suitable computing device that can be purchased from any known suitable manufacture. In some embodiments of this invention, processor 45 is positioned within, housed within and/or a part of housing 30 of projector 20 and/or body 42 of interchangeable character body 40.

According to some embodiments of this invention, processor 45 is electrically connected to and/or otherwise in a suitable manner electrically communicates, for example, with a suitable wired connection and/or a suitable wireless connection, with readable memory device 46. In some embodiments of this invention, readable memory device 46 includes content and/or stored information, for example, specifically related to a story, a theme and/or a content corresponding to, related to and/or part of interchangeable character body 40. In some embodiments of this invention, processor 45 and readable memory device 46 are both positioned and/or housed within body 42 of interchangeable character body 40. In some embodiments of this invention, processor 45 and readable memory device 46 are both positioned and/or housed within housing 30 of projector 20. In other embodiments of this invention, processor 45 is positioned and/or housed within housing 30 of projector 20 and readable memory device 46 is positioned and/or housed within body 42.

According to some embodiments of this invention, interchangeable character body 40 has electrical connection 47 to panel 32 of housing 30.

In some embodiments of this invention, projector lens module 50 is positioned within and/or mounted with respect to housing 30. According to some embodiments of this invention, audio output device 55 is positioned within and/or mounted with respect to housing 30. In some embodiments of this invention, processor 45 and/or readable memory device 46 operates and/or controls projector lens module 50 to display an image, for example, an image related to interchangeable character body 40. In other embodiments of this invention, processor 45 and/or readable memory device 46 operates and/or controls audio output device 55 to produce a sound, for example, a sound related to interchangeable character body 40.

In some embodiments of this invention, a plurality of or a multiplicity of interchangeable character bodies 40 are replaceable and/or interchangeable with each other. Having several or many interchangeable character bodies 40 that can be replaced with each other allows for projector 20 to produce an image related to different story themes, different character environments and/or different arrangements.

According to some embodiments of this invention, each of interchangeable character bodies 40 replaceably fits within, can be exchanged with each other and/or can be interchanged with each other, for example, at electrical connection 47. In some embodiments of this invention, electrical connection 47 comprises or includes an 8-pin electrical connector electrically connected to processor 45 and/or readable memory device 46. However, in other embodiments of this invention, electrical connection 47 can be formed by any other suitable mechanical and/or electrical connection known to those skilled in the art.

According to some embodiments of this invention, processor 45 and/or readable memory device 46 of each replaceable character body 40 has a different story and/or theme content of electronically stored information that can be accessed with the readable memory device.

In some embodiments of this invention, projector lens module 50 produces and/or has an image that is static and/or dynamic. In some embodiments of this invention, projector lens module 50 produces and/or has an image that is digital and/or a photo, such as a photo on microfilm.

According to some embodiments of this invention, audio output device 55 produces and/or has a sound that is digital and/or acoustic. In some embodiments of this invention, projector lens module 50 produces, creates and/or contains an image that corresponds to an unique story theme of interchangeable character body 40.

According to some embodiments of this invention, a method for operating a projector, includes the steps of forming electrical connection 47 on panel 32 of housing 30, interchangeably mounting and/or securing interchangeable character body 40 to panel 32, mounting processor 45 and/or readable memory device 46 within interchangeable character body 40, operably mounting projector lens module 50 directly to and/or with respect to housing 30, operably mounting audio output device 55 directly to and/or with respect to housing 30, using processor 45 and/or readable memory device 46 to operate projector lens module 50 to display an image related to interchangeable character body 40, and/or using processor 45 and/or readable memory device 46 to operate audio output device 55 to produce a sound related to interchangeable character body 40.

According to some embodiments of this invention, a plurality of interchangeable character bodies 40 are interchangeably mounted and each interchangeable character body 40 has different information stored on readable memory device 46 and/or other suitable memory device communicating with processor 45 positioned in and/or within interchangeable character body 40 and/or housing 30. In some embodiments of this invention, the image is static and/or dynamic. According to some embodiments of this invention, the sound is digital and/or acoustic.

In some embodiments of this invention, electrical connection 47 includes electrically communicating through 8-pin electrical connector 48 and/or any other suitable mechanical and/or electrical device to electronically communicate with processor 45 using a wired electrical connection and/or a wireless electrical connection. According to some embodiments of this invention, electrical connection 47 comprises any suitable electrical, mechanical and/or other suitable device that allows interchangeable character body 40 to connect and/or electronically communicate with processor 45 while maintaining structural stability required to accommodate and/or maintain a suitable location and/or a relative position of interchangeable character body 40 with respect to panel 32 and/or housing 30.

According to some embodiments of this invention, such as shown in FIG. 8, interchangeable character body 40 contains, holds and/or houses processor 45 and/or readable memory device 46 and/or any other suitable memory and/or processor chip that has wired and/or wireless electrical connections and/or communications with the audio signals and image signals produced by projector 20. In some embodiments of this invention, interchangeable character body 40 comprises electrical connection 47, such as shown in FIGS. 8-11, which can be an electromechanical prong and/or any other suitable mechanical device and/or electrical device that forms a suitable electrical connection with interchangeable character body 40 and any suitable element of projector 20. In some embodiments of this invention, such as shown in FIGS. 8-11, electrical connection 47 is in, at and/or near bottom surface 43 of interchangeable character body 40. As shown in FIGS. 8 and 9, receiver 44 has a block shape and can have any other suitable shape and/or size that allows electrical connector 41 to electrically connect with electrical connector 48. In some embodiments of this invention, such as shown in FIGS. 8-11, receiver 44 forms a female electrical connector and electrical connector 48 forms a mating male electrical connector. In other embodiments of this invention, receiver 44 forms a male electrical connector and electrical connector 48 forms a mating female electrical connector. In some embodiments of this invention, receiver 44 is a structure such as a housing, a body and/or any other suitable structural element that can be a part of and/or attached to body 42.

In some embodiments of this invention, as shown in FIGS. 8 and 9, interchangeable character body 40 connects with and/or fits into a corresponding receiver 44 attached directly to or with respect to panel 32 and/or any other suitable part of housing 30. According to some embodiments of this invention, interchangeable character body 40 can have any suitable dimensions and/or shape, particularly to strengthen the connection between interchangeable character body 40, receiver 44, panel 32 and/or another part of housing 30, and to provide structural strength when removing, attaching and/or otherwise interchanging multiple interchangeable character bodies 40.

Figure 10:
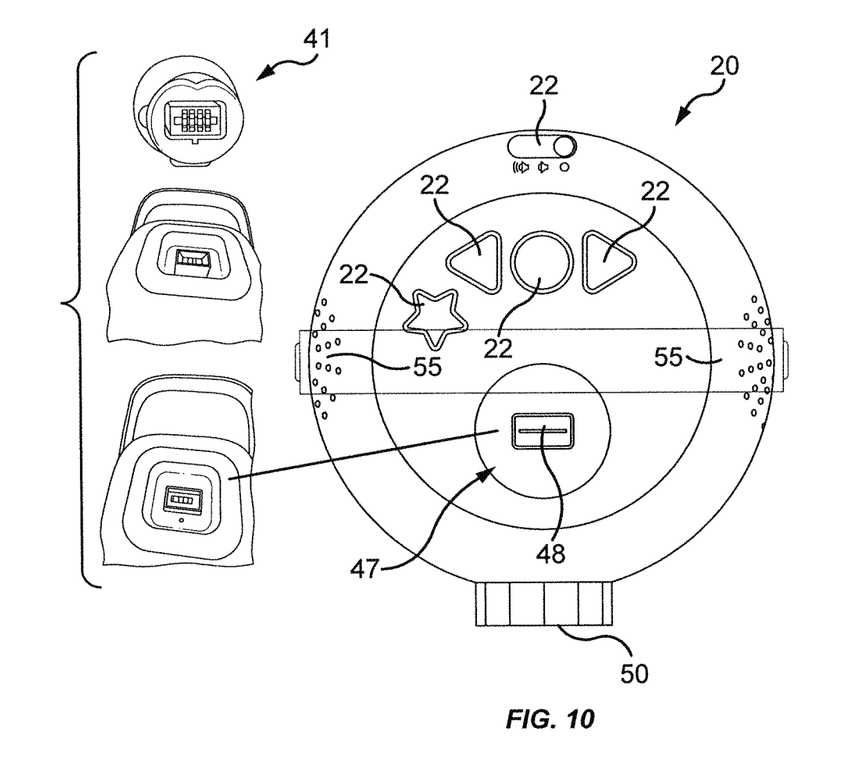
FIG. 10 is a top view of a projector, according to one embodiment of this invention.

According to some embodiments of this invention, as shown in FIG. 10, projector 20 comprises electrical connector 41 that is molded and/or raised. In some embodiments of this invention, electrical connector 41 is constructed of any suitable translucent plastic and in some embodiments are backlit so electrical connector 41 can easily be seen in a dark environment.

According to some embodiments of this invention, projector 20 comprises an inlay, such as a wood inlay on panel 32 and/or any other top portion of projector 20. In some embodiments of this invention, the inlay can be constructed of wood and/or any other suitable material through which electrical connector 41 can extend and/or project through the inlay, particularly at or near electrical connection 47.

In some embodiments of this invention, such as shown in FIG. 10, projector lens module 50 can be rotated and/or otherwise moved to focus projector lens module 50. According to some embodiments of this invention, a housing of projector lens module 50 can be ribbed and/or otherwise have any other suitable frictional grip to better rotate and/or otherwise move and thus focus projector lens module 50.

According to some embodiments of this invention, such as shown in FIG. 10, a suitable part of projector lens module 50 is recessed, for example approximately ⅜ inch, to rotate and/or focus a projector lens. In other embodiments of this invention, electrical connection 47 can have any other suitable structure, size and/or shape, particularly to prevent damage to interchangeable character body 40 as multiple interchangeable character bodies 40 are mounted on and removed from panel 32 and/or any other part of housing 30.

In some embodiments of this invention, such as shown in FIG. 10, interchangeable character body 40 can be any suitable character and/or characters that house, retain and/or otherwise hold processor 45 and/or any other suitable readable memory device 46, for example, that contains the audio and the video using electrical connection 47 and/or any other suitable structure and/or device.

Figure 11:
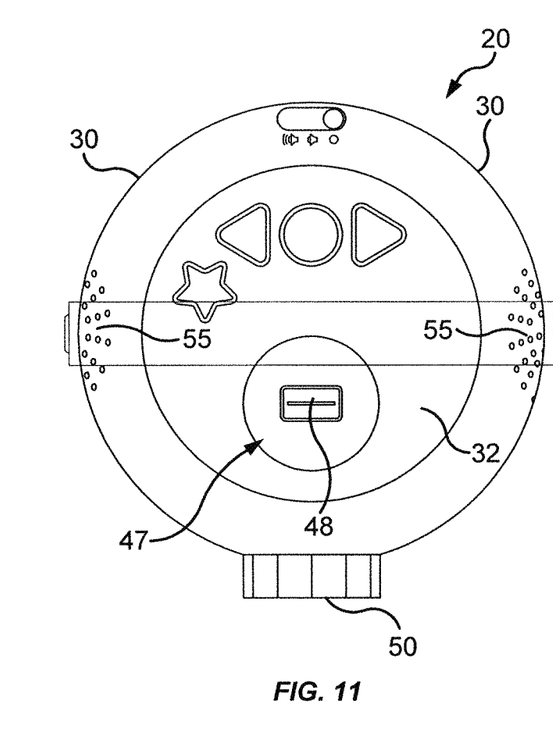
FIG. 11 is a top view of a projector, according to one embodiment of this invention.
Figure 12:
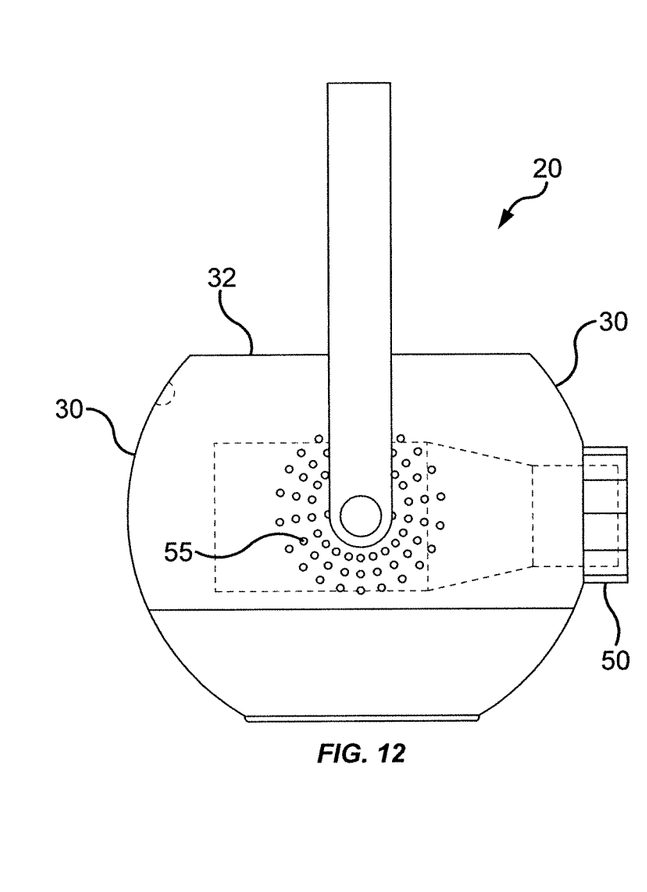
FIG. 12 is a side view of the projector, as shown in FIG. 11.

In some embodiments of this invention, such as shown in FIG. 11, projector 20 comprises any suitable known control for controlling the audio content and/or the video content of a theme and/or story of interchangeable character body 40. In some embodiments of this invention, such as shown in FIG. 10, when any switch 22 is operated and/or pressed, different audio controls, video controls, lighting controls and/or other suitable controls can be operated.

In some embodiments of this invention, a night light can be operated to turn on and turn off and thus illuminate, for example, a bottom portion of housing 30 and/or any other suitable portion of housing 30. According to some embodiments of this invention, when a nightlight is turned on, for example, a portion of housing 30 can change colors and/or can change and/or fade through different colors.

Figure 13:
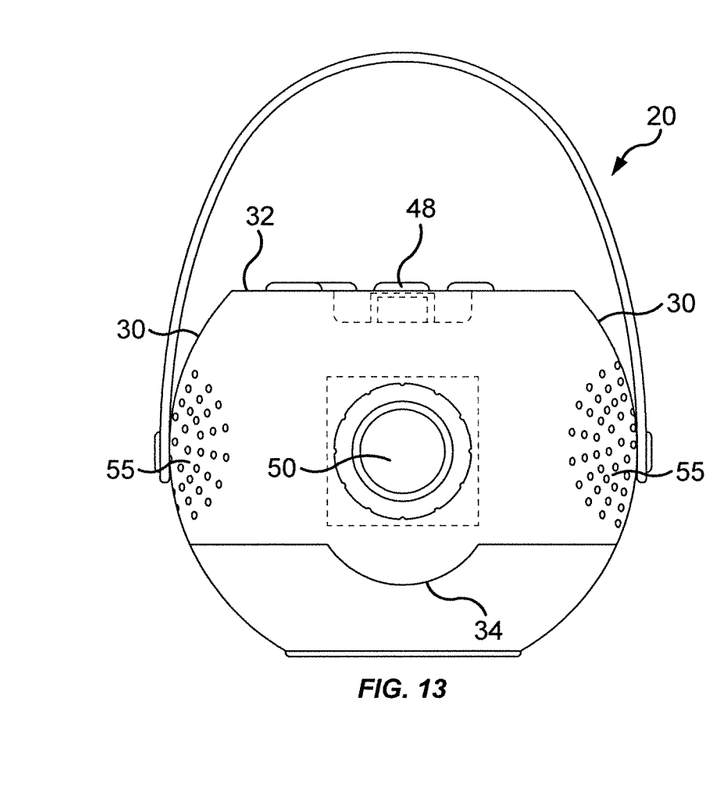
FIG. 13 is a front view of the projector, as shown in FIG. 11.

According to some embodiments of this invention, such as shown in FIG. 13, curve 34 is purely for a design shape, which is shown in the shape of a smile. In other embodiments of this invention, curve 34 can have any other suitable shape.

Figure 14:
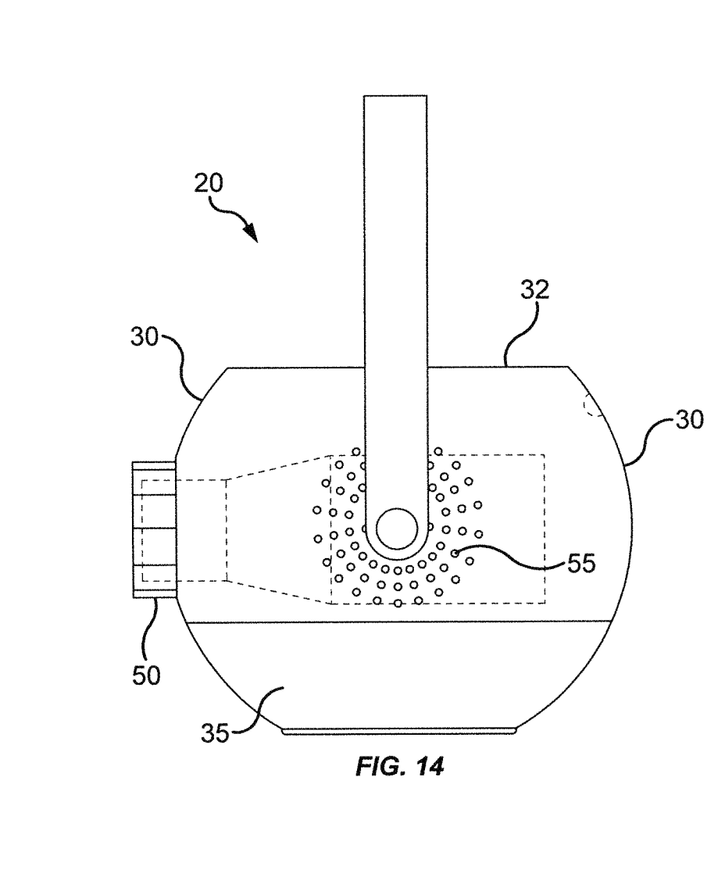
FIG. 14 is a side view, opposite the side view shown in FIG. 12, of the projector, as shown in FIG. 11.

In some embodiments of this invention, such as shown in FIG. 14, bottom portion 35 can be of any suitable material. In some embodiments of this invention, bottom portion 35 is white in color and is also made of an opaque and/or translucent material. In some embodiments of this invention bottom portion 35 houses a light, such as for a nightlight. When the nightlight is on, this bottom portion 35 area lights up and/or can also have any suitable number of colored lights, such as colored LED lights for the nightlight.

Figure 15:
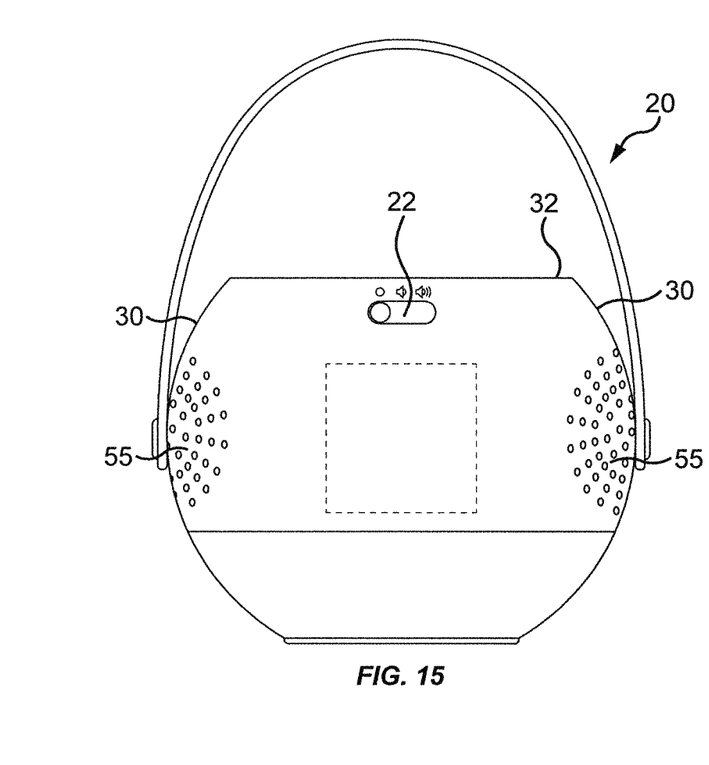
FIG. 15 is a rear view of the projector, as shown in FIG. 11.

According to some embodiments of this invention, such as shown in FIG. 15, projector 20 comprises switch 22. In some embodiments of this invention, switch 22 can be used to turn the unit on and/or off. In some embodiments of this invention, switch 22 can be used to turn on and/or turn off projector 20. According to some embodiments of this invention, switch 22 can have 3 positions to turn projector 20 on, to operate projector 20 with a low-volume, and/or to operate projector 20 with a high-volume.

In some embodiments of this invention, projector 20 comprises internal batteries, internal rechargeable batteries and/or an electrical connection for charging the rechargeable batteries.

Figure 16:
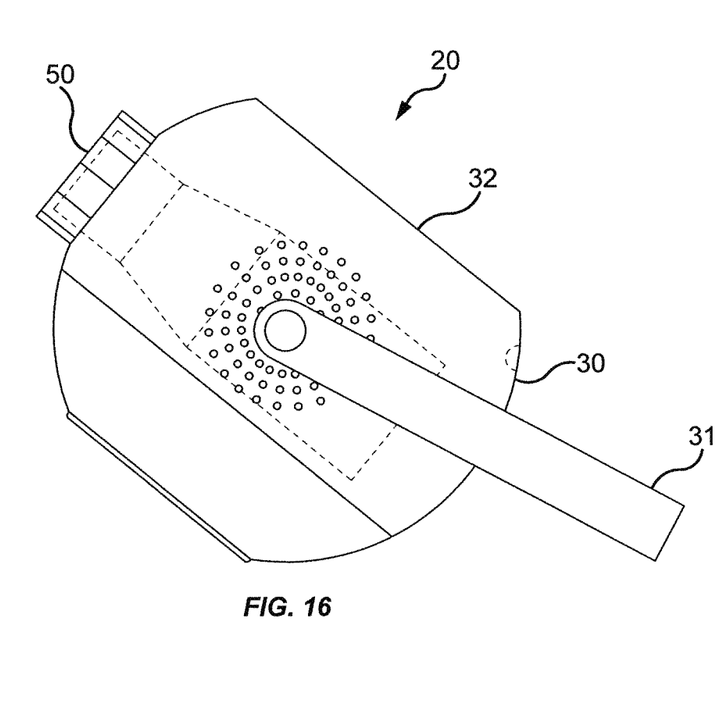
FIG. 16 is a side view of a projector, according to one embodiment of this invention.

In some embodiments of this invention, such as shown in FIG. 16, handle 31 can be used to carry housing 30 and/or fix a relative position of housing 30. According to some embodiments of this invention, handle 31 can have any suitable spring and/or frictional device that provides housing 30 an ability to remain and/or stay in a particular position, such as shown in FIG. 16.

Figure 17:
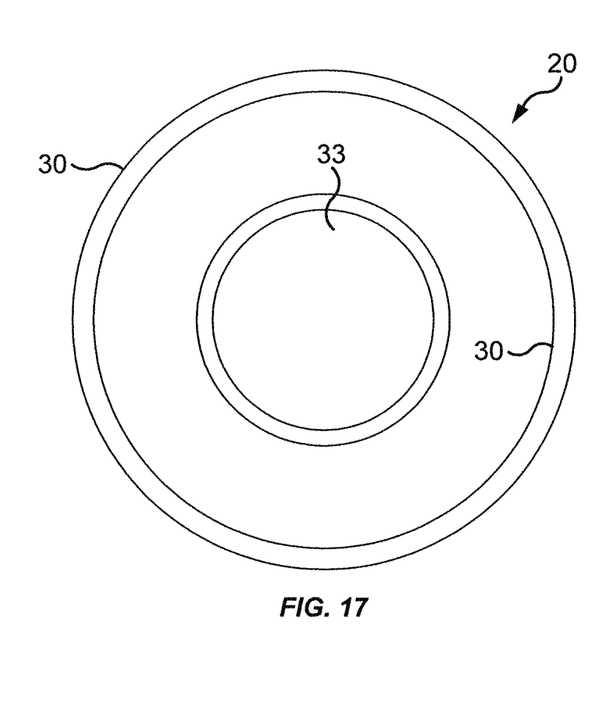
FIG. 17 is a bottom view of the projector, as shown in FIG. 11.

According to some embodiments of this invention, such as shown in FIG. 17, housing 30 has a bottom area and/or bottom surface 33. In some embodiments of this invention, bottom surface 33 has a non-slip quality that can be used to make it more difficult to move projector 30 when used.

While in the foregoing detailed description this invention has been described in relation to certain embodiments, and many details have been set forth for purposes of illustration, it will be apparent to those skilled in the art that this invention is susceptible to additional embodiments and that certain of the details described herein can be varied considerably without departing from the basic principles of and desired results from this invention.

The invention claimed is:
1. An audio and animation device comprising:
a housing having a panel, an interchangeable character body replaceably mounted with respect to the panel, the interchangeable character body having a readable memory device mounted within the housing and/or a body of the interchangeable character body, a processor mounted within the housing and/or the body of the interchangeable character body, the processor in communication with the readable memory device, the interchangeable character body having an electrical connection to the panel, the electrical connection including an electrical connector mounted on the panel, the electrical connection positioned near a bottom surface of the interchangeable character body, a structural receiver connected to the interchangeable character body, the structural receiver mounted and positioned about the electrical connector to form the electrical connection between the interchangeable character body and the electrical connector, a plurality of the interchangeable character bodies are interchangeable with each other, the readable memory device of each of the interchangeable character bodies has a story specific to each interchangeable character body and a different story content compared to each other, a projector lens module mounted with respect to the housing, an audio output device mounted with respect to the housing, the processor operating the projector lens module to display an image related to the interchangeable character body, and the processor operating the audio output device to produce a sound related to the interchangeable character body.

2. An audio and animation device according to claim 1, wherein each of the interchangeable character bodies replaceably fits within the electrical connection.

3. An audio and animation device according to claim 1, further comprising an inlay element positioned on the panel and between the structural receiver and the electrical connector.

4. An audio and animation device according to claim 1, wherein the image is static and/or dynamic.

5. An audio and animation device according to claim 1, wherein the image is digital and/or a photo.

6. An audio and animation device according to claim 1, wherein the sound is digital and/or acoustic.

7. An audio and animation device according to claim 1, wherein the electrical connection includes an 8-pin electrical connector electrically connected to the processor.

8. An audio and animation device according to claim 1, wherein the image is a digital image and/or a photo image.

9. An audio and animation device according to claim 1, wherein the image corresponds to an unique story theme of the interchangeable character body.

10. An audio and animation device according to claim 1, wherein the readable memory device includes information specifically related to a story, a theme and/or a content corresponding to the interchangeable character body.

11. A projector comprising:
a housing having a panel, a character body interchangeably mounted to the panel, a readable memory device positioned in the housing and/or the character body, a processor mounted within the housing and/or a body of the character body, the processor in communication with the readable memory device, an electrical connection on the panel electrically connecting the readable memory device in the housing and/or the character body, the electrical connection having an electrical connector mounted on the panel, the electrical connection positioned near a bottom surface of the interchangeable character body, a structural receiver attached to the interchangeable character body, the structural receiver mounted and positioned about the electrical connector to form the electrical connection between the interchangeable character body and the electrical connector, a plurality of the interchangeable character bodies are interchangeable with each other, the readable memory device of each of the interchangeable character bodies has a story specific to each interchangeable character body and a different story content compared to each other, a projector lens module operably mounted to the housing, an audio output device operably mounted to the housing, the processor operating the projector lens module to display an image related to the character body, and the processor operating the audio output device to produce a sound related to the character body.

12. A projector according to claim 11, wherein each of the interchangeable character bodies replaceably fits within the electrical connection.

13. A projector according to claim 11, further comprising an inlay element positioned on the panel and between the structural receiver and the electrical connector.

14. A projector according to claim 11, wherein the image and/or the sound is digital and/or acoustic.

15. A projector according to claim 11, wherein the electrical connection includes an 8-pin electrical connector electrically connected to the readable memory device.

16. A method for operating a projector, including the steps of:
forming an electrical connection on a panel of a housing;
interchangeably mounting a character body to the panel;
mounting a readable memory device within the housing and/or the character body;
mounting a processor within the housing and/or a body of the character body;
forming communication between the processor and the readable memory device,
forming the electrical connection with an electrical connector mounted on the panel,
positioning the electrical connection near a bottom surface of the interchangeable character body,
connecting a structural receiver to the interchangeable character body,
mounting the structural receiver and positioning the structural receiver about the electrical connector to form the electrical connection between the interchangeable character body and the electrical connector,
wherein a plurality of the interchangeable character bodies are interchangeable with each other,
wherein the readable memory device of each of the interchangeable character bodies has a story specific to each interchangeable character body and a different story content compared to each other,
operably mounting a projector lens module with respect to the housing;
operably mounting an audio output device with respect to the housing;
the processor operating the projector lens module to display an image related to the character body; and
the processor operating the audio output device to produce a sound related to the character body.

17. The method according to claim 16, wherein each of the interchangeable character bodies replaceably fits within the electrical connection.

18. The method according to claim 16, further including positioning an inlay element on the panel and between the structural receiver and the electrical connector.

19. The method according to claim 16, wherein the image and/or the sound is digital and/or acoustic.

20. The method according to claim 16, wherein the electrical connection includes electrically communicating through an 8-pin electrical connector to the readable memory device.

* * * * *